United States Patent [19]

Kondoh et al.

[11] 4,065,768
[45] Dec. 27, 1977

[54] RADAR APPARATUS

[75] Inventors: Teruo Kondoh; Kazuhiro Ban; Akio Kawamoto; Yoshiki Masuno; Mitsuhiro Yoshida, all of Amagasaki, Japan

[73] Assignee: Mitsubishi Denki Kabushiki Kaisha, Tokyo, Japan

[21] Appl. No.: 701,252

[22] Filed: June 30, 1976

[30] Foreign Application Priority Data

| July 1, 1975 | Japan | 50-81595 |
| July 31, 1975 | Japan | 50-93564 |
| Aug. 1, 1975 | Japan | 50-107384[U] |
| Aug. 29, 1975 | Japan | 50-105375 |
| Aug. 29, 1975 | Japan | 50-105376 |
| Oct. 31, 1975 | Japan | 50-132030 |
| Dec. 4, 1975 | Japan | 50-144737 |

[51] Int. Cl.$^2$ ............... G01S 9/44; G01S 9/24
[52] U.S. Cl. ..................... 343/9; 343/14; 343/17.5
[58] Field of Search ............... 343/9, 14, 17.5

[56] References Cited

U.S. PATENT DOCUMENTS

| 3,525,993 | 8/1970 | Peace et al. | 343/9 X |
| 3,832,709 | 8/1974 | Klein et al. | 343/9 X |
| 3,863,253 | 1/1975 | Kiyoto et al. | 343/9 |
| 3,898,653 | 8/1975 | Ban et al. | 343/9 X |
| 3,898,655 | 8/1975 | Tresselt | 343/9 X |
| 3,913,106 | 10/1975 | Sato | 343/14 X |

Primary Examiner—T.H. Tubbesing
Attorney, Agent, or Firm—Sughrue, Rothwell, Mion, Zinn and Macpeak

[57] ABSTRACT

A radar apparatus comprises a microwave head portion in which a solid state oscillator, such as a Gunn oscillator, is utilized to generate a transmitting signal wave to be transmitted toward a target as well as a local oscillation signal wave by which an intermediate frequency signal is obtained upon a receipt of a reflected wave from the target. A transmission-reception switch means connected to a hybrid coupler constitutes a switching means for switching the operation of the radar apparatus between a transmitting mode and a receiving mode. A signal processing portion is provided in which the instantaneous amplitude value of the intermediate frequency signal according to a phase variation of the intermediate frequency signal due to the movement of the target is obtained by sampling the intermediate frequency signal with sampling pulses, whereby the velocity and moving direction of the target are determined and, by combining such information, an alarm is actuated.

38 Claims, 23 Drawing Figures

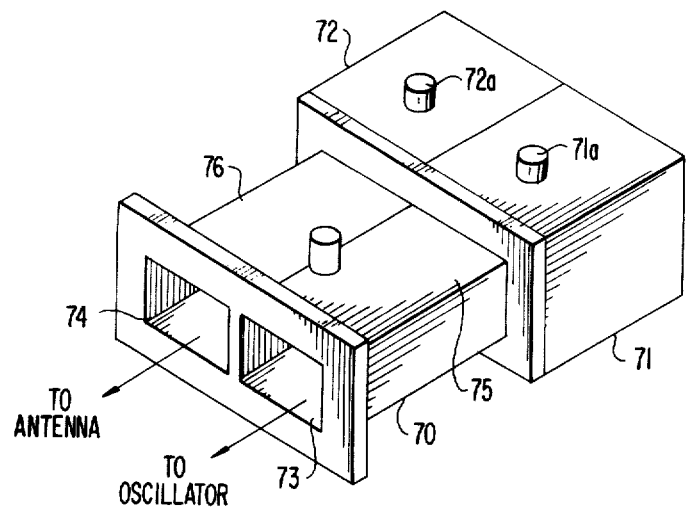
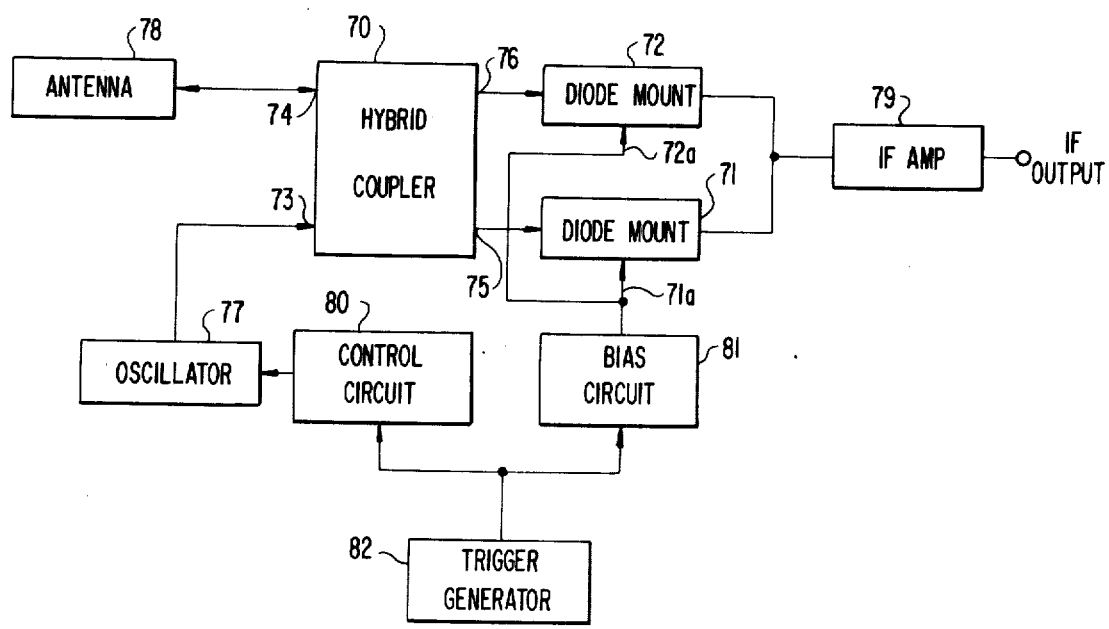

RADAR APPARATUS

FIELD OF THE INVENTION

The present invention relates to a radar apparatus, and particularly, to a signal processing portion and a microwave head portion thereof for determining the velocity and direction of movement of a target.

DESCRIPTION OF THE PRIOR ART

Heretofore, the velocity of a target has been obtained in a pulse radar apparatus on the basis of a Doppler wave produced either by, mixing a received signal and a portion of a transmitting signal, mixing an intermediate frequency signal and a signal having a frequency equal to the intermediate frequency, or detecting the phase of a rising part of the intermediate frequency signal using a digital circuit. Alternatively, the velocity has also been obtained from a variation of the distance information.

Each of the latter methods has certain disadvantages. It is impossible to obtain exact distance information by the first method. In the second method a precise oscillator or a down converter is necessary to produce the signal having the same frequency as the intermediate frequency. The third method requires a high gain, wide bandwidth amplifier having a good signal to noise ratio as the intermediate frequency amplifier. The fourth method requires complicated signal processing for considerably long time to obtain the velocity information.

The usual methods for determining the moving direction of the target include, differentiation of the distance information or utilization of a pair of mixers or detectors for treating an RF signal which is a reflection signal from the target.

In the differentiation method the direction can not be determined unless the target moves by a distance greater than a minimum distance increment which can be resolved by the apparatus. Therefore it takes a long time to determine the direction when the velocity of the target is low. For example, for a pulse radar apparatus capable of transmitting pulses each having a width of 20 ns, the moving direction of the target can not be determined unless it moves by a distance larger than 3m.

In the method using mixers or detectors, the received signal is divided into two branches and a local oscillation signal, in case of the superheterodyne system, or a reference signal, in case of the homodyne system, is also divided into two branches, the phase of one of which is shifted by 90°. The intermediate frequency signals or Doppler signals obtained by mixing the received signals and the local or reference signals are summed or subtracted in a hybrid circuit to determine the direction. A number of RF circuit elements are required because of the necessities of the RF mixers or detectors and distributers for the received signal and the local or reference signal. Therefore, the latter method requires a very complicated construction and has a very large circuit loss for, particularly, microwave, sub-millimeter wave or millimeter wave operations, causing the system to become uneconomical.

SUMMARY OF THE INVENTION

It is an object of the present invention to eliminate the above mentioned disadvantages inherent to the conventional systems. According to the present invention, a radar apparatus comprises a microwave head portion including an oscillator which selectively produces a transmitting wave, to be directed to a target, and a local oscillation signal wave upon receipt of a reflection wave from the target. The local signal is used to produce an intermediate frequency signal, in time sharing manner, and a signal processing portion which holds instantaneous amplitude values of the intermediate frequency signal by sampling the latter with sampling pulses. The instantaneous amplitude values are used to determine exact distance information, velocity information, and the moving direction information of the target.

Further, according to the present invention, the microwave head portion coprises an oscillator which produces time shared transmitting wave and local oscillation signal wave, a hybrid coupler connected to the oscillator, a transmission-reception switch connected to the hybrid coupler, and a mixer, whereby the system loss and undesired radiation in the microwave head portion are greatly reduced.

BRIEF DESCRIPTION OF THE DRAWINGS

FIG. 10 is a perspective view of a microwave head portion of another embodiment of the present invention.

FIG. 11 is a block diagram of the microwave head portion in FIG. 10.

DESCRIPTION OF PREFERRED EMBODIMENTS

Figure 1:
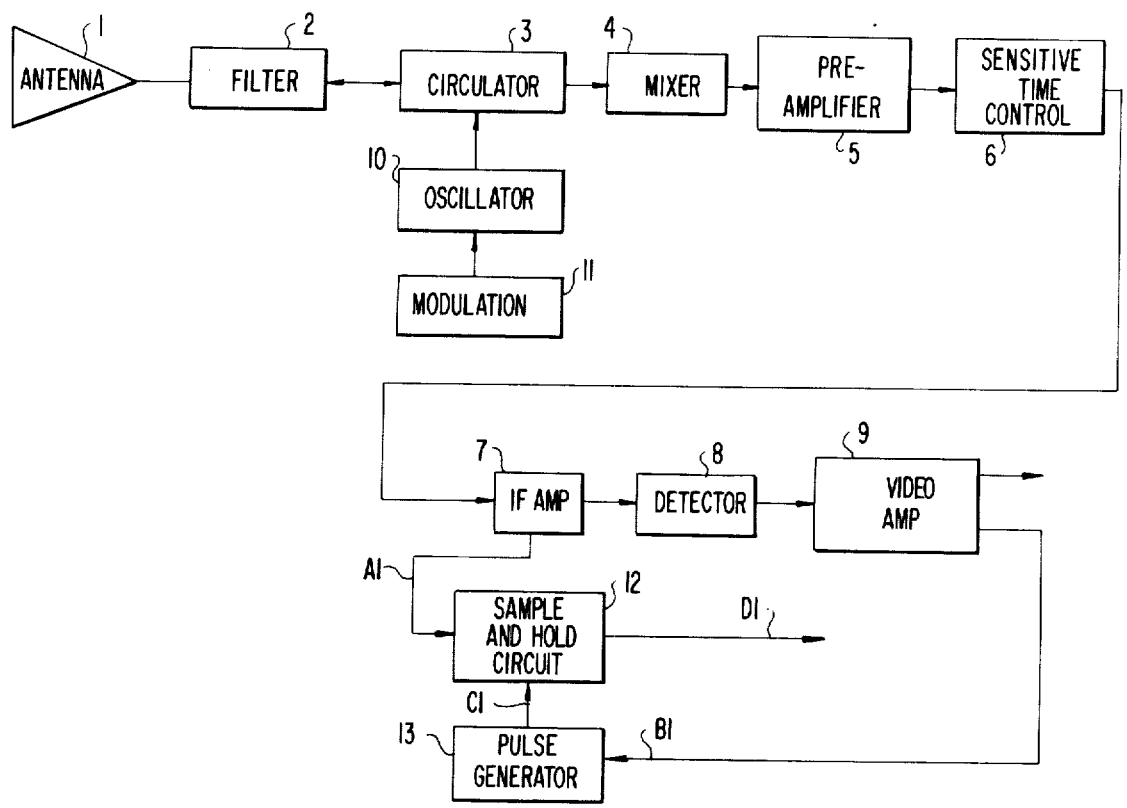
FIG. 1 is a block diagram showing an embodiment of the present invention.
Figure 2:
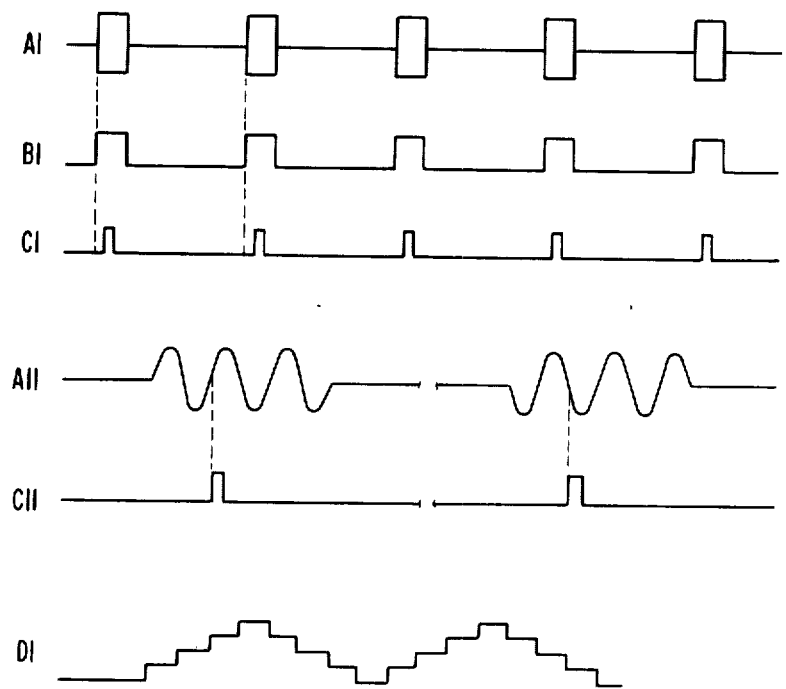
FIG. 2 shows waveforms for explaining the operation of the radar apparatus in FIG. 1.

An embodiment of the present invention will be explained with reference to FIGS. 1 and 2. In FIG. 1, the present radar apparatus includes an antenna 1, a filter 2, a circulator 3, a mixer 4, a pre-amplifier 5, a sensitivity time control (STC) circit 6, an intermediate frequency amplifier or distributor 7, a detector 8, a video amplifier 9, a Gunn oscillator 10, a modulator 11 which controls the oscillation frequency of the Gunn oscillator 10, a sample-hold circuit 12 and a sampling pulse generator 13.

With this construction, the output signal of the Gunn oscillator 10 is pulse-modulated by the modulator 11 to produce an oscillation output including first and second frequencies during alternating frequency periods, respectively. The oscillator output of a first frequency is supplied via the circulator 3 to the filter 2, the output of which is supplied to the antenna 1 for transmission. The reflected signal is received by the antenna 1 and passed through the filter 2 and the circulator 3 to the mixer 4. In the mixer 4, an intermediate frequency signal is produced on the basis of the difference between the first and second frequencies. The intermediate frequency signal is amplified by the pre-amplifier 5 and then any transmitting signal component therein is removed therefrom by the sensitivity time control circuit 6. The circuit 6 may be a conventional circuit which is operative to pass to its output terminal only those signals occurring after the time of transmission. At the same time, the intermediate frequency signal is amplified by the IF amplifier or distributor 7. The amplified intermediate frequency signal is supplied to the detector 8 in which the intermediate frequency is converted into a video signal and then amplified by the video amplifier 9 to obtain an output which can be used by conventional means to determine the distance of the target. The amplified intermediate frequency signal A1 is also supplied to an input of the sample-hold circuit 12. On the other hand, a sampling trigger C1 is produced by supplying the video signal B1 from the video amplifier 9 to the sampling pulse generator 13. The pulse width of the sampling trigger C1 is narrower than the period of the intermediate frequency signal. By sampling the instantaneous value of the intermediate frequency signal applied to the sample-hold circuit 12 with the sampling trigger, a Doppler wave D1 (i.e. a waveform containing velocity information) is obtained. This is explained more fully below.

The operation of the radar apparatus shown in FIG. 1 will be described with reference to FIG. 2, wherein the waveforms A1 to D1 appear at the similarly designated lines in FIG. 1. Further, in FIG. 2, waveforms AII and CII correspond to the waveforms A1 and C1 on an enlarged time scale. As mentioned above, the sampling trigger C1 is produced in response to the video signal pulse B1 from the video amplifier 9. The sampling trigger C1 is made to occur substantially at the center of the video signal pulse B1 as shown. As illustrated, the sampling trigger C1 is coincident in time with the initial part of the second cycle of the intermediate frequency signal AII. The intermediate frequency signal is sampled with the sampling trigger every transmitting repetition to detect the phase thereof. Since the phase varies correspondingly to the Doppler frequency cycles when the target is moving, a Doppler wave, i.e., velocity information in proportion to the relative velocity of the target, is obtained as shown by the waveform D1.

With the construction of the radar apparatus as mentioned above, the exact distance information as well as the exact velocity information can be easily obtained.

Figure 5:
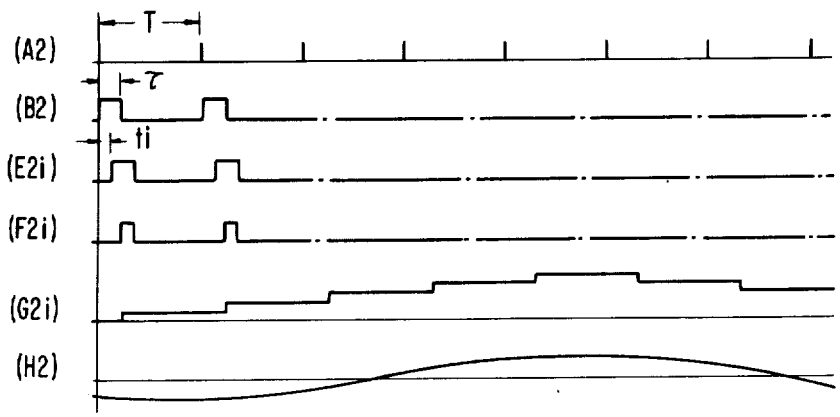
FIGS. 4 and 5 show waveforms for explaining the operation of the radar apparatus in FIG. 3.

A second embodiment of the present invention, which detects the condition of a target approaching within an alarm region, will be described with reference to FIGS. 3 to 5. Generally, when an alarm distance is reasonably far from the radar system, there is the possibility of the existence of fixed obstacles at places nearer than the approaching target. According to the present invention, even if there are fixed obstacles between the antenna and the moving target, it becomes easy to detect the approaching target by using a simple circuit which is adapted to enlarge the width of the transmitting pulse to a time width between the transmitting time point and the receiving time point.

Figure 3:
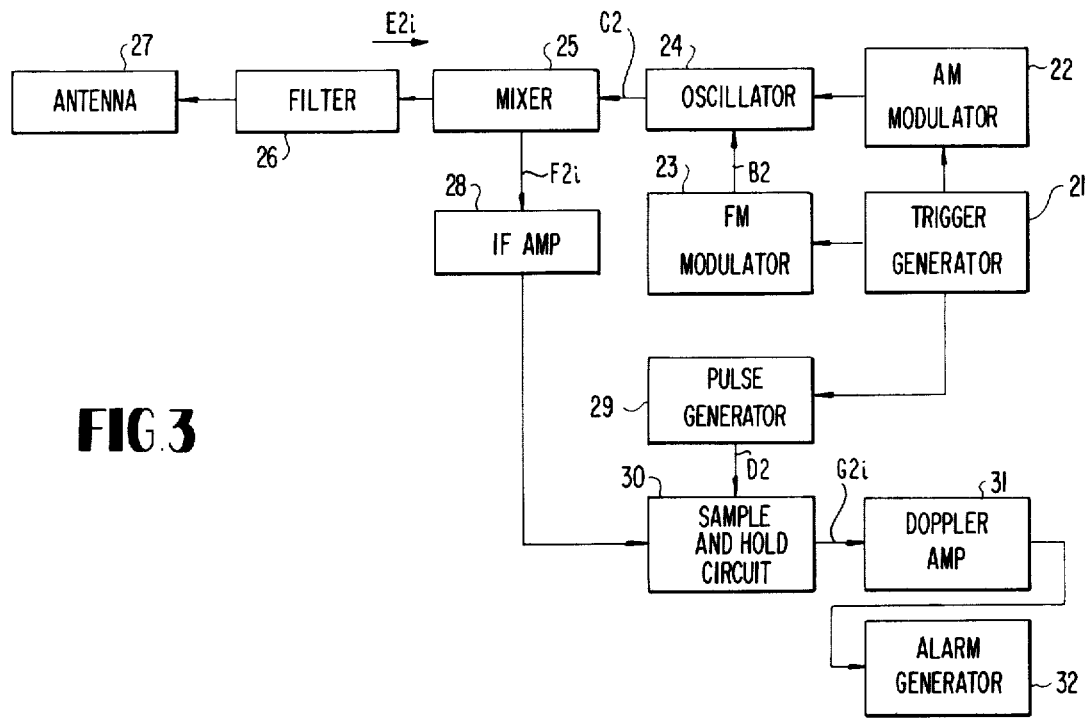
FIG. 3 is a block diagram of another embodiment of the present invention.

In FIG. 3, an oscillation frequency of an oscillator 24 is controlled by a trigger signal generating circuit comprised of a trigger signal generator 21 and an FM modulator 23 so that the oscillator produces a transmitting signal having frequency $f1$ and duration time $\tau$ and subsequently a local oscillation signal having frequency $f2$ and duration time equal to a repetition time T subtracted by $\tau$. The repetion time T is controlled by the trigger generator 21. In this embodiment, the substantial part of the transmitting signal passes a mixer 25 of the flange type and a filter 26 and is transmitted by an antenna 27. The local oscillation signal produced by the oscillator 24 subsequent to the generation of the transmitting signal reaches the mixer 25 and is blocked by the filter 26 from passing therethrough. A reflection signal from the target is received by the antenna 25 and passes through the filter 26 to the mixer 25. The received signal and the local oscillation signal are mixed in the mixer 25 to produce an intermediate frequency signal. The intermediate frequency signal obtained in the mixer 25 is amplified by an intermediate frequency amplifier circuit 28 and then sampled in a sample and hold circuit 30 with a sampling pulse which is produced by a pulse generator 29 connected to the trigger generator circuit 21. The sampling pulse has a width narrower than the period of the intermediate frequency signal, to thereby produce a Doppler signal component contained in the intermediate frequency signal.

In this case as will be explained more fully below, the reflection signal from a fixed obstacle becomes a non-varying d.c. component when sampled. The latter is blocked by an A.C. amplifier 31, referred to herein as a Doppler amplifier and, therefore, does not appear at the output of this circuit. A moving target within the alarm range results in an output signal from the Doppler amplifier 31, and an alarm of any desired type may be actuated by the output signal to signal the existence of the approaching target.

The operation of the radar apparatus shown in FIG. 3, in particular, the distance detection function thereof, will be described with reference to the waveforms in FIG. 4.

Figure 4:
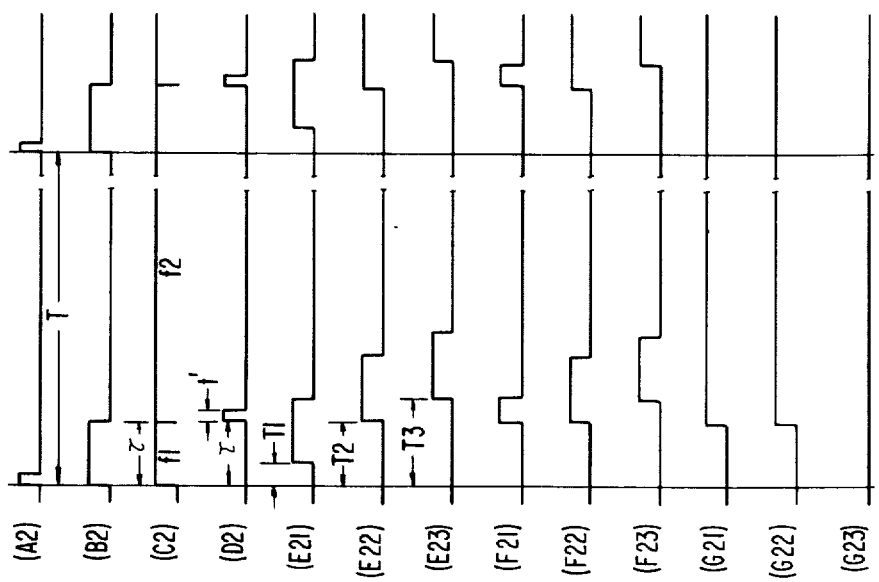

In FIG. 4, a waveform A2 shows a trigger which is used to determine the repetition period and represent a zero distance. A waveform B2 is an output waveform of the FM modulator 23 and shows the pulse width $\tau$ of the transmitting signal. A waveform C2 shows a variation of frequency of the output of the oscillator in which a frequency $f1$ is produced during the period $\tau$ and a frequency $f2$ during T-$\tau$. A waveform D2 is a sampling gate delayed from the trigger A2 by $\tau$ and the pulse width thereof (t') is sufficiently shorter than $1/f_{IF}$ where $f_{IF}$ is the intermediate frequency. Waveforms E21 to E23 show a time relation between reflection signals from different targets before the entrance to the mixer 25. The respective times between transmission and reception being $t1$, $t2$ and $t3$. The frequency of the reflected signals are also $f1$. Waveforms F21 and F23 are the outputs of the mixer 25 when the waveforms E21 and E23, respectively, are supplied to the input of the mixer. The frequency of these signals is the intermediate frequency $f_{IF} = f1 - f2$. The intermediate frequency signal $f_{IF}$ is initially obtained at $\tau$ regardless of $ti$, provided that $ti$ ($i = 1, 2, 3,...$) is smaller than $\tau$. This is because there is no local oscillation signal before T. Waveforms G21 and G23 are obtained by sampling the waveforms F21 to F23 with the sampling gate D2, respectively. In the case where there is an IF signal during the period of the sampling gate, the amplitude thereof is held until the next sampling gate as shown by the waveforms G21 to G22. Where $t3 > \tau$, the output becomes zero as shown by waveform G23.

Since the sampling output can be obtained only when $ti < \tau$ as mentioned above, it is possible to detect the target existing within a distance R by selecting $\tau$ from the equation $R = C$ 96 /2, where C is the propagation velocity of an electromagnetic wave.

The degree of accuracy of the detected distance R depends upon the accuracy of the time $\tau$ setting, and the transition time of the output frequency of the oscillator 24 from $f1$ to $f2$.

The detection of a moving target within the distance R will be described with reference to FIG. 5. FIG. 5 shows the waveforms of FIG. 4 on a reduced time scale. In this case, it is assumed that $ti$ is smaller than $\tau$ and the target resulting in the signal E2$i$ is moving. In this case, since the phase of the intermediate frequency signal E2$i$ varies with the movement of the target, the amplitude at successive sampling times (substantially $\tau$ in this case) also varies correspondingly. Therefore, the sampled signal varies every sampling period as shown by the waveform G2$i$ and the fundamental wave thereof becomes a Doppler signal of the moving target as shown by the waveform H2.

In this case, of course, the intermediate frequency signal F2$i$ in every repetition period T must be coherent. This requirement is satisfied by a varactor Gunn oscillator 24. Any other oscillators which can satisfy the above requirement may be used in this invention.

In the above mentioned embodiment, when $\tau << T$, it may be possible to make the time period of generation of the local oscillation signal equal to the generation period $\tau$ of the transmitting signal and make the oscillator output zero until the next repetition time T. This will be effective in reducing the power rate of the oscillator. That is, in FIG. 3, by driving the oscillator 24 with a modulation signal having pulse width $2\tau$ which is produced by the AM modulator 22 triggered by a synchronous trigger pulse of the trigger generator 21, the power rate of the oscillator can be reduced by $2t/T$.

Furthermore in the same embodiment, the alarm distance R is $C\tau/2$. This means that any target within a range zero to R can be detected. This case corresponds to a case where the sampling gate D2 in FIG. 4 is set at the time $\tau$. When the sampling gate is set at the time $\tau + \Delta t$, the alarm range can be from Rmin = $C\cdot\Delta\tau/2$ to Rmax = $C(\tau + \Delta \tau)/2$. This is because, for the signal received at $ti < \Delta\tau$. the intermediate frequency signal which is the output of the mixer (F2$i$) disappears before the sampling time $\tau + \Delta \tau$. In this manner, the detection of the moving target within a near range, which is due to the side lobe of the antenna, can be avoided.

As a third embodiment of the present invention, a radar apparatus having a microwave head portion which is simple in construction and by which the system loss and the undesired radiation are much reduced will be described hereinafter.

Figure 6:
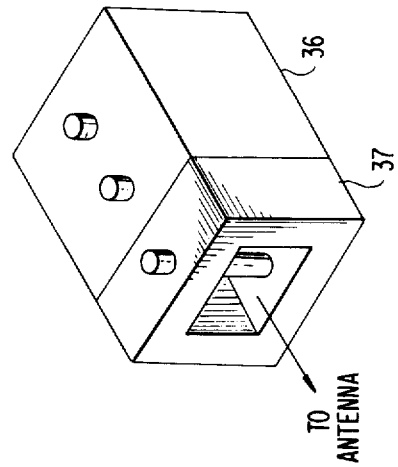
FIG. 6 is a perspective view of a microwave head portion of a conventional radar apparatus.

Considering a general radar apparatus in which a single oscillator is used as the transmitter oscillator and the local oscillator, FIG. 6 is a perspective view of an example of the microwave head portion of such radar apparatus. The apparatus in FIG. 6 has a flange type mixer 37 directly connected to the output side of the oscillator 36 and, therefore, the transmitter-receiver switching means is unnecessary. In this case, the transmitting power may be coupled partially to the mixer 37, causing a loss to occur. The receiving power is not coupled to the mixer 37 completely. Therefore, this apparatus has an inherent loss. Further, the local oscillation power during the receiving mode may be partially radiated from the antenna.

Figure 7:
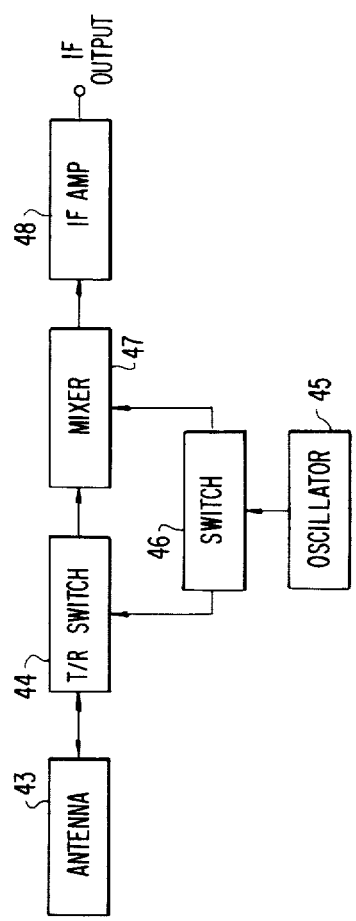
FIG. 7 is a block diagram of the microwave head portion of another embodiment of the present invention.

On the other hand, the radar apparatus in FIG. 7 utilizes a circulator or a TR switch as the transmitting-receiving switch device 44. A transmitting signal produced by the oscillator 45 is fed through a switch 46 to the transmitting-receiving switch device 44 and then radiated by the antenna 43. In the receiving mode, the oscillator 45 is oscillating at the local oscillation frequency and feeding the local oscillation signal through the switch 46 to the mixer 47. On the other hand, the receiving signal enters through the antenna 43 and the transmitting-receiving switch device 44 into the mixer 47 in which the latter is mixed with the local oscillation signal, resulting in the intermediate frequency signal which is amplified by the intermediate frequency amplifier 48. The radar apparatus in FIG. 7 has no system loss and there is no radiation of the local oscillation signal. However, the latter system provides other problems, e.g., the structure of the system is necessarily complicated.

Figure 8:
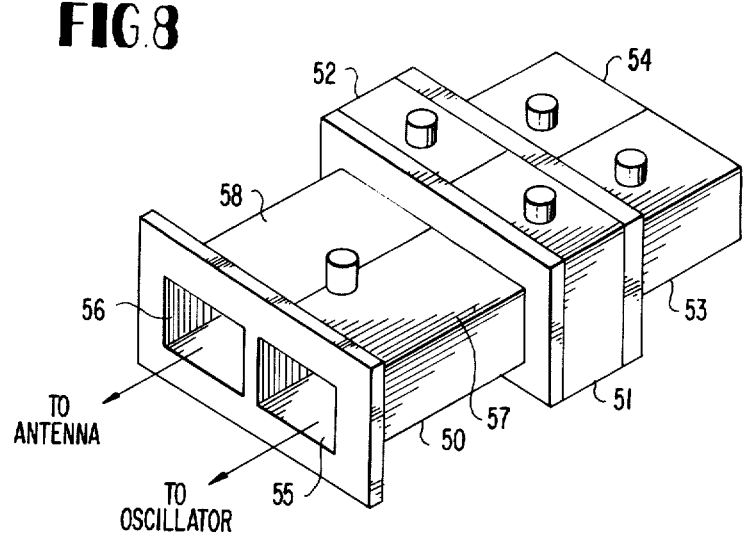
FIG. 8 is a perspective view of a microwave head portion of another embodiment of the present invention.
Figure 9:
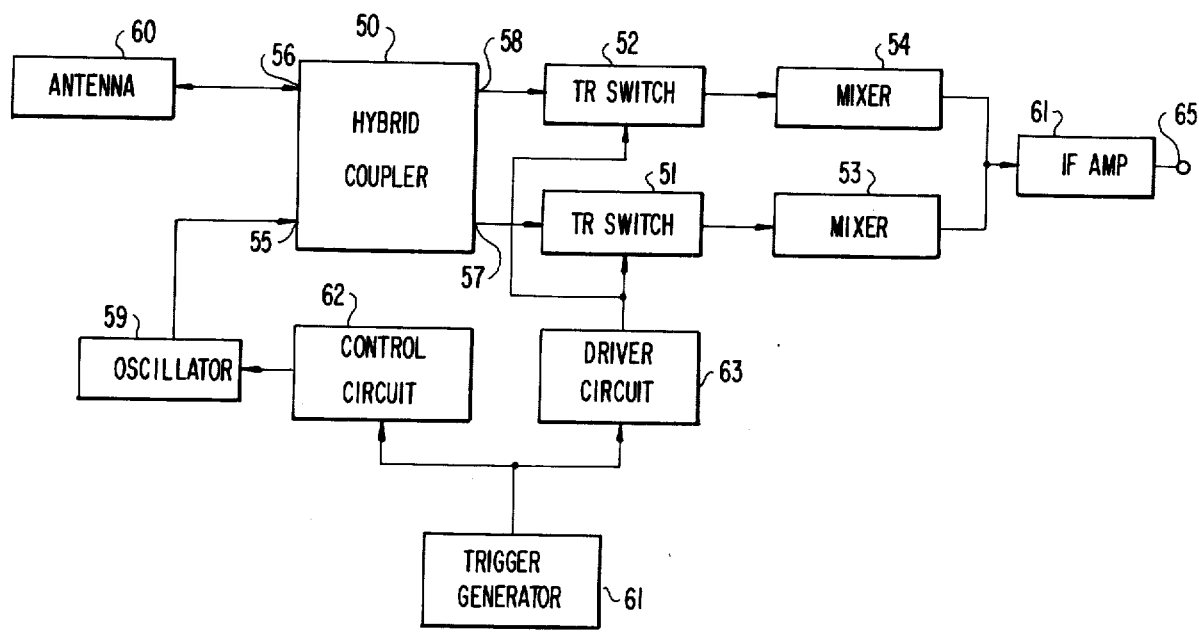
FIG. 9 is a block diagram of the microwave head portion in FIG. 8.

FIGS. 8 and 9 show a radar apparatus by which the above mentioned disadvantages are resolved. In FIG. 8, a hybrid coupler 50 is provided, which has four terminals 55 to 58. Numerals 51 and 52 are TR (transmitting and receiving) switches and numerals 53 and 54 are mixers, respectively. FIG. 9 shows the microwave head portion of FIG. 8 along with other elements in block diagram form. In FIG. 9, an oscillator 59, having a solid state oscillation element operates at transmitting frequency $f1$ in the transmitting mode. The transmitting signal of frequency $f1$ is supplied to an oscillator terminal 55 of the hybrid coupler 50 and appears at terminals 57 and 58 with a phase difference. In the transmitting mode, a pair of TR switches 51 and 52 are driven by a TR switch driving circuit 63 to place them in a short-circuited condition. Therefore, the microwave power supplied from the hybrid coupler 50 to the TR switches is reflected thereby and returned to the hybrid coupler 50, wherein the signals are combined. Then the microwave power is supplied from the antenna terminal 56 of the coupler to the transmitting and receiving antenna 60 for radiation.

In the receiving mode, the oscillator 59 operates at the local oscillation frequency $f2$ and the output power of the oscillator is divided by two in the hybrid coupler 50. The branched local oscillation frequency signals pass through the TR switches 51 and 52, respectively, which are in the open state, and supplied to the mixers 53 and 54. At the same time, the receiving signal received by the antenna 60 is fed to the antenna terminal 56 of the hybrid coupler 50 and branched. The branched receiving signals pass through the TR switches 51 and 52 and are supplied to the mixers 53 and 54, respectively. In the mixers, the branched receiving signals are mixed with the local oscillation signals. The intermediate frequency signals from the mixers 53 and 54 are added to each other and the resultant intermediate frequency signal is amplified by an intermediate frequency amplifier 61, and the amplified signal appears at an intermediate frequency output terminal 65 thereof. The signal may then be further processed to obtain target information, such as in FIG. 1.

The oscillation frequency of the oscillation 59 is controlled by a frequency control circuit 62 according to the operation modes. The frequency control circuit 62 and the TR switch driving circuit 63 are synchronized by a trigger generator 61 which controls the repetition of the transmitting and the receiving modes.

In this manner, the single hybrid coupler 50 is used together with transmitting and receiving mode switching devices and mixers. Therefore, the circuit construction of the microwave head portion can be greatly simplified in comparison with the conventional system of the type which employs both the balance type transmitting and receiving mode switching devices and the balance type mixers. Regardless of the simplified construction of the present apparatus, there is no disadvantage in functions.

Further, the system loss as well as the problem of the radiation of the local oscillation power are also greatly improved in comparison with the conventional apparatus such as shown in FIG. 6 which is simple in construction but has a large system loss FIGS. 10 and 11 show an improvement of the microwave head portion of the preceding embodiment. In FIG. 10, numeral 70 designates a hybrid coupler which has four terminals 73 to 76, numerals 71 and 72 are diode mounts having diode terminals 71a and 72a, respectively. FIG. 11 shows in block circuit diagram form the microwave head portion in FIG. 10 plus other elements. In FIG. 11, an oscillator 77 produces a transmitting signal which is fed to the oscillator terminal 73 of the hybrid coupler 70 wherein it is divided into two signals, each being different in phase from the other. The transmitting signals having different phases are supplied through the output terminals 75 and 76 thereof to the diode mounts 71 and 72, respectively. At this time the diode mounts 71 and 72 act as switches and are in short-circuited conditions. Therefore, the inputs thereto are reflected and returned to the hybrid coupler 70. Then the signal is fed from the antenna terminal 74 to the antenna 78 and transmitted thereby. In the receiving mode operation, the diode mounts 71 and 72 act as mixers. The oscillator 77 operates at the local oscillation frequency and the output thereof is divided in the hybrid coupler 70, the resultant signals being supplied to the diode mounts 71 and 72, respectively. At the same time the receiving signal is received by the antenna 78 and supplied to the hybrid coupler 70. The receiving signals branched in the hybrid coupler 70 are supplied to the diode mounts 71 and 72 and mixed with the local oscillation signals therein to produce intermediate frequency signals which are added and amplified by the intermediate frequency amplifier 79. The oscillation frequency of the oscillator 77 is controlled by a frequency control circuit 80. The diode mounts 71 and 72 are biased by a diode biasing circuit 81 such that the diode mounts act as switches in a short-circuited condition during the transmitting mode to reflect the microwave input from the hybrid coupler 70 and act as mixers during the receiving mode.

The frequency control circuit 80 and the diode biasing circuit 81 are synchronized in operation by a trigger generator 82 correspondingly to the transmitting mode and the receiving mode.

In this manner, by using the diodes of the diode mounts 71 and 72 in combination with the hybrid coupler 70, it becomes possible to use the hybrid coupler as the balance type transmitting and receiving switching element as well as the mixing element of the balance type mixer, which results in a minimization of the number of required microwave semiconductor elements and hence, a simplification of the structure of the radar apparatus.

Figure 12:
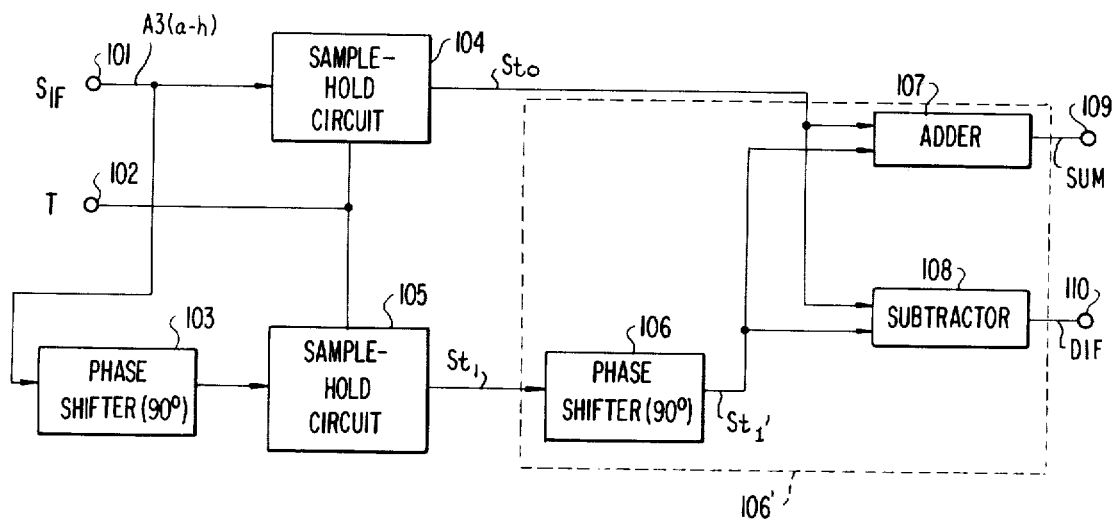
FIG. 12 is a block diagram of a signal processing portion of another embodiment of the present invention.
Figure 13A:
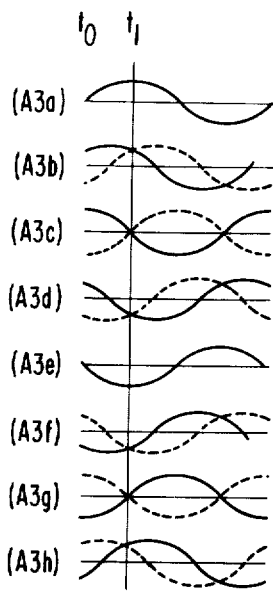
FIGS. 13A and 13B show waveforms for explaining the operation of the signal processing portion in FIG. 12.
Figure 13B:
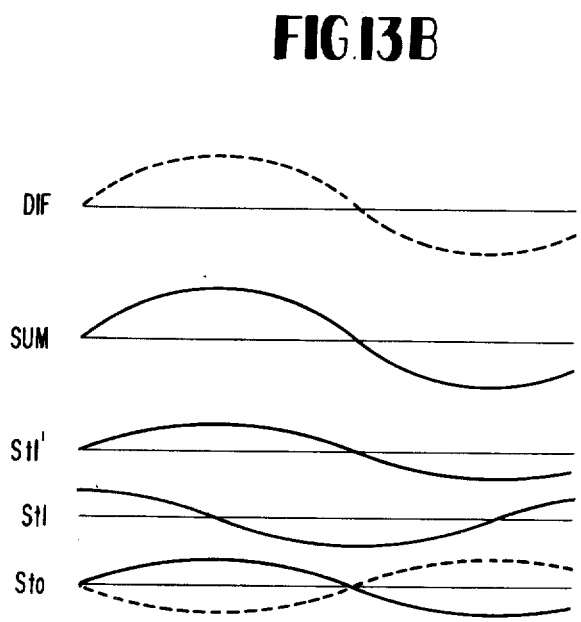

As another embodiment of the present invention, a radar apparatus capable of discriminating the moving direction of a target will be described with reference to FIG. 12 which shows an example of circuit construction of the signal processing portion of the radar and to FIG. 13A and 13B which show various waveforms for explaining the operation of the circuit in FIG. 12. In FIG. 12, the signal $S_{IF}$ at input terminal 101 is an intermediate frequency signal that occurs once each repetition period of the radar and is derived from the received signal that has been reflected from a target. The signal $S_{IF}$ may correspond to the coherent IF signals derived by the embodiments of FIGS. 1, 3, 9, and 11. The signal is fed to a sample and hold circuit 104 and a phase shifter 103 which shifts the signal phase by 90°. The output of the 90° phase shifter 103 is supplied to sample and hold circuit 105. A sampling trigger T, delayed a predetermined time from a trigger signal, which controls the electromagnetic wave transmission, is supplied to an input terminal 102. Each of the sampling trigger pulses has a width shorter than the intermediate frequency signal period and is supplied to both sample and hold circuits 104 and 105 simultaneously. The instantaneous amplitude values of the intermediate frequency signal $S_{IF}$ and that delayed by 90° are held in the sample and hold circuits 104 and 105 until the next repetition period. When the input signal is a reflected signal from a moving target, the outputs of the sample and hold circuits 104 and 105 become Doppler signals whose frequency is proportional to the velocity of the moving target, and, when the target is stationary, they become D.C. signals. The output of the sample and hold circuit 104 is supplied directly to an adder circuit 107 and a subtraction circuit 108 and the output of the sample and hold circuit 105 is supplied through a 90° phase shifter 106 to the adder circuit 107 and the subtraction circuit 108. A Doppler signal of an approaching target is obtained at the output terminal 109 of the adder circuit 107, and a Doppler signal of a departing target is obtained at the output terminal 110 of the subtraction circuit 108.

The operation of this embodiment will be described with reference to the waveforms in FIGS. 13A and 13B. The intermediate frequency signals $S_{IF}$ supplied to the input terminal 101 is shown in FIG. 13A in which A3a to A3h show the variations of the signal $S_{IF}$ with time during eight repetition periods a through h of the transmitting signal. The solid line shows the phase variation of the intermediate frequency signal for the approaching target and the dotted line shows that for the leaving target.

When it is assumed that the sampling time of the sample and hold circuit 104 is $t_o$, the signal entering into the sample and hold circuit 105 is the intermediate frequency signal the phase of which is shifted by 90° by the phase shifter 103 and thus the sampling time thereof effectively becomes $t_1$. In reality, the sample time does not change from $t_o$ to $t_1$, but the IF wave shifts relative to the sample time. Thus for ease of understanding it is simpler to illustrate the situations as if the IF inputs to circuits 104 and 105 are the same as one another and the sample time differs by 90°. The output waveforms of the sample and hold circuits 104 and 105 can be represented as waveforms $St_o$ and $St_1$ in FIG. 13B when taken along a time axis corresponding to the repetition time of the waveforms A3a to A3h in FIG. 13A. In this Figure, the solid line and the dotted line $St_o$ show the waveforms at the output of circuit 104 for the approaching target and the departing target, respectively. The output of the sample and hold circuit 105 is shown only by the solid line because the Doppler signals for the approaching target and the departing target are the same. Thus, referring to FIG. 13A it can be appreciated that the hold signal resulting from sampling at $t$, will be the same whether the target is approaching or receeding. It should be noted however that the case illustrated as a specific one wherein the starting point for the approaching and receeding targets is such that $t_1$ samples the 90° phase point. Since the phase shifter 106 in FIG. 12 acts to shift the intermediate frequency signal by 90°, the output of the sample and hold circuit 105 is phase delayed by 90° as shown by the waveform $St_1'$ in FIG. 13B. When the Doppler signals $St_o$ and $St_1'$ obtained in this manner are added in an adder circuit 107, a waveform such as shown by SUM in FIG. 13B is obtained, resulting in only the Doppler signal for the approaching target. When a subtraction between the signals $St_o$ and $St_1'$ is performed in the subtraction circuit 108, the difference becomes as shown by the waveform DIF in FIG. 13B which shows the Doppler signal for the departing target.

In the construction shown in FIG. 12, the functions of the 90° phase shifter 106, the adder circuit 107 and the subtractor circuit 108 may be replaced by a single 90° hybrid circuit 106' as shown by the dotted line in FIG. 12. That is, for the outputs $St_o$ and $St_1$ of the sampling-hold circuits 104 and 105, the signals $St_o$ for the approaching and the departing targets are out of phase by +90° and −90° with respect to the signals $St_1$ for the approaching and the departing targets, respectively. The 90° hybrid circuit has a pair of input terminals and a pair of output terminals and, when one of the input terminals is supplied with a signal which is out of phase by ± 90° with respect to the other input terminal which is assumed as a reference, the signal out of phase by +90° appears at one of the output terminals and the signal out of phase by −90° appears at the other output terminal.

In a case where the signal processing portion in FIG. 12 functions ideally, the Doppler signals for the approaching target and the departing target may be completely separated and appear at the output terminals 109 and 110, respectively. However, in the actual circuits, it is impossible to separate the two Doppler signals completely. Therefore, in order to discriminate the direction of the target, i.e., to know whether the target is approaching or departing, it is desirable to use an additional circuit to process the output signals at the output terminals 109 and 110 of FIG. 12. The additional circuit may be one in which the ratio of the peak value of the output signal at one output terminal to that at the other output terminal is detected to discriminate the moving direction of the target.

In the embodiment in FIG. 12, only the fundamental components of the signal processing portion of the radar apparatus are shown. However, it may be necessary to employ various amplifiers and filters etc. in desired locations in this embodiment as will be well understood by anyone of ordinary skill in the art. The fundamental operation of this apparatus will not be adversely affected by the addition of such circuits.

According to the preceding embodiment of the present invention, the moving direction of the target can be discriminated by the output signals of the single receiving mixer. Therefore, it becomes possible to considerably reduce the number of required microwave parts in comparison with the conventional apparatus and, since it is possible to avoid circuit loss, the receiving sensitivity is improved and the level of the local oscillation signal can be reduced.

Furthermore, with the embodiment previously described, direction discrimination is possible if at least one cycle of the Doppler signal is obtainable. The one cycle of the Doppler signal corresponds to a distance of movement of the target by a half wavelength of the microwave (carrier wave) signal. Therefore, if the carrier frequency is, for examle, $10GH_z$, the distance of the target movement necessary to determine the direction thereof may be 1.5 cm or less. This provides a remarkable improvement in the data rate.

A further improvement in the direction sensitivity is achieved by the embodiment of FIG. 14, which will be explained with reference to FIGS. 15, 15B, and 16. As mentioned previously, in the preceding embodiment, the phase difference between two Doppler signals has to be 0° or 180° in order to detect the sum and difference between the Doppler signals. That is, it is necessry to shift the intermediate frequency signal by just 90° and, concurrently, to shift the Doppler signal, whose frequency varies more than one decade according to the velocity of the target, by just 90°. This is because, for example, an automobile may run at a velocity, for example, between 10 km/h to 100km/h, in which case, the Doppler frequency will change by 10 times. Further, in the preceding embodiments, the output voltage levels of two Doppler signals must be exactly the same and, for this and other reasons, the circuit design and adjustments of the system becomes relatively difficult.

Figure 14:
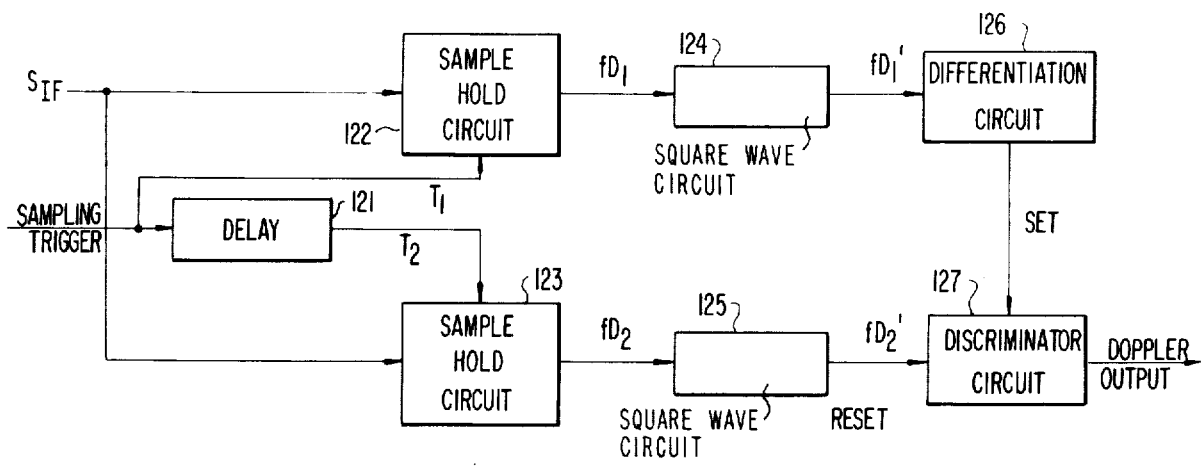
FIG. 14 is a block diagram of a signal processing portion of another embodiment of the present invention.
Figure 15A:
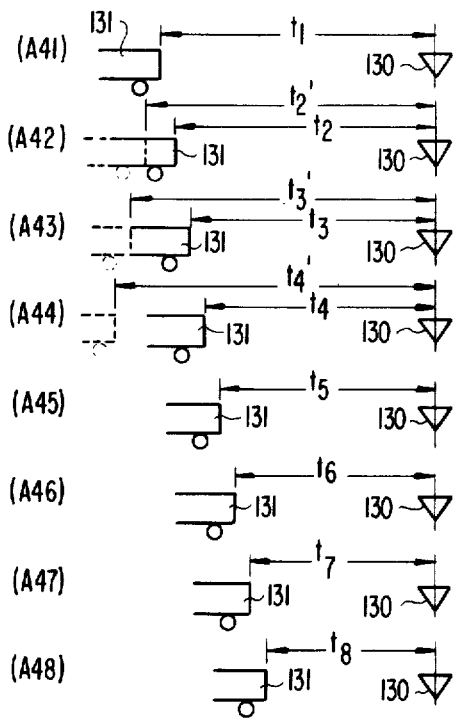
FIGS. 15A, 15B, and 16 show waveforms for explaining the operation of the signal processing portion in FIG. 14.

In FIG. 14, the coherent, intermediate frequency signal $S_{IF}$, occurring in every pulse repetition period, is branched and the resultant two $S_{IF}$'s are supplied to sample and hold circuits 122 and 123, respectively. The sample and hold circuit 122 samples the instantaneous amplitude value of the intermediate frequency signal with a sampling trigger $T_1$ which has a pulse width shorter than the intermediate frequency signal and which is delayed from the transmitting time by a certain time. The sample and hold circuit 123 samples the intermediate frequency signal with a similar sampling trigger $T_2$, which is delayed from $T_1$ by a delay circuit 121 by a time corresponding to 90° of the intermediate frequency signal. Where the input signal is a reflection from a stationary object, there is no phase change of the intermediate frequency signal at successive sample times and, therefore, the outputs of the two circuits 122 and 123 become D.C. signals. In a case when the target is moving, the intermediate frequency containing the Doppler frequency $f_D$ which is proportional to the velocity of the target becomes an input signal having frequency $f_{IF} \pm f_D$. Therefore, the phase of the intermediate frequency signal at the sampling time varies from one sample period to the next, and the sample and hold circuits 122 and 123 provide Doppler frequency signals which have the same frequency $f_D$ but differ in phase 90°. Considering the phase of the output of sample and hold circuit 123 as a reference, the phase of the Doppler output of the sample and hold circuit 122 is delayed by 90° in the case of an approaching target and advanced by 90° in the case of a departing target. These Doppler outputs are supplied to square wave circuits 124 and 125, respectively, to shape the output wave forms to a rectangular shape. The period of the negative half cycle of the output of the circuit 125 is used as a reset signal for a discrimination circuit 127 composed of a flip-flop, and the negative going portion of the rectangular output waveform of the circuit 124 is derived by a differentiation circuit 126 and used as a set signal for the discrimination circuit 127. The latter circuit (127) is designed to operate with negative pulses so that, when the set signal is applied thereto while a negative reset signal is also applied thereto, the output thereof is not changed and, when the set signal is applied while there is no negative reset signal, the output is inverted. By applying the negative going portion of the output of the circuit 124, which is derived by the differential circuit 126, to the discriminator 127, the latter provides an output signal having the same repetition rate as that of the Doppler frequency for the departing target. Since, for the approaching target, the output thereof is not changed, the discriminator provides a D.C. output. When an inverter is inserted between the circuit 124 and the differential circuit 126 and the resulting negative pulse outputs of the differential circuit 126 are used as the set signal, the outputs of the discriminator circuit 127 for departing and the approaching targets will be inverted with respect to the preceding case. A similar effect to the above may be obtained by using the output of the circuit 124 as the reset signal for the discrimination circuit 127and applying the output of the circuit 125 to the differentiation circuit 126.

The operation of the present embodiment shown in FIG. 14 will be explained with reference to the waveforms in FIGS. 15A, 15B, and 16. In FIG. 15A, the relation between the antenna 130 and the moving target 131 is shown by the diagrams A41 to A48 inFIG. 15A on the basis of the electromagnetic wave propagation time. Assuming that, at a first transmitting time, the target 131 is at a distance corresponding to the propagation time $t_1$, at the second transmitting time, it is at a distance corresponding to the propagation time $t_2$ and so on, each of the transmitting waves from the antennal 130 will be returned as an echo after a time period twice the time required to reach the target. The waveforms in FIG. 15B correspond to the intermediate frequency signals of the echoes. Each transmission occurs at time $T_o$ and the echoes are received at $T_o'$. The transmitting pulse is coherent in every pulse repetition and therefore evey echo waveform has the same phase at $T_o'$. The intermediate frequency signals $f_{IF}$ are sampled at sampling trigger times $T_1$ and $T_2$, which times occur after $T_o'$ and are fixed relative to $T_o$. The time between $T_1$ and $T_2$ corresponds to a 90° phase difference in the intermediate frequency. The two waveforms obtained by sampling the IF with triggers $T_1$ and $T_2$, respectively, have a 90° phase difference with respect to each other. The solid lines in FIG. 15A and 15B are for an approaching target and the dotted lines are for a departing target. The sampled waveforms will be explained with reference to FIG. 16.

Figure 15B:
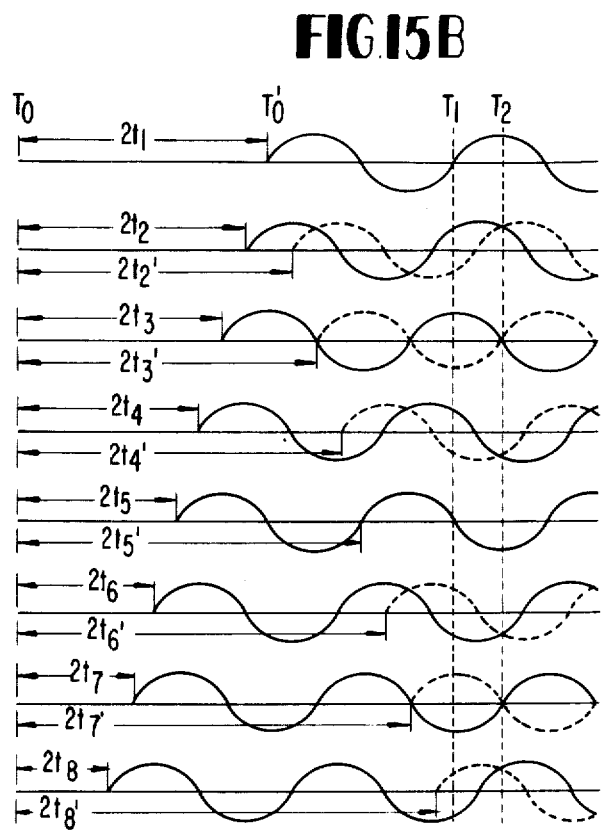
Figure 16:
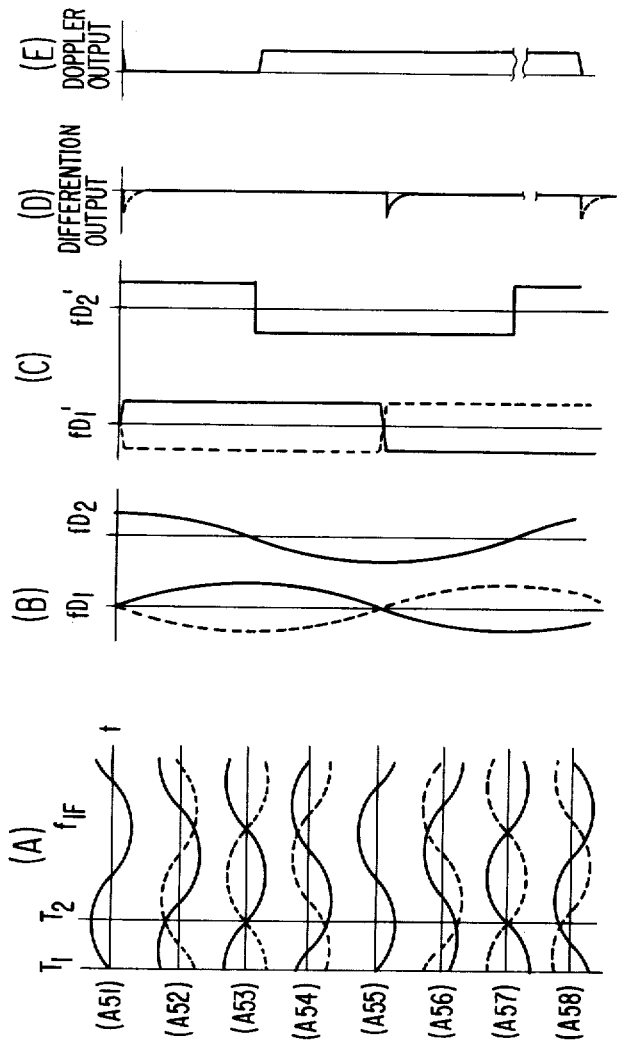

Thewaveforms in part A of FIG. 6 show the variation of phase of the intermediate frequency signal $f_{IF}$ having the same waveforms as those in FIG. 15B with sampling times, in which $T_1$ is the sampling time of the sample and hold circuit 122 and $T_2$ is the sampling time of the sample and hold circuit 123. The solid lines show the phase variations of the intermediate frequency signal for the approaching target and the dotted lines shows those for the departing target. The waveforms $fD_1$ and $fD_2$ in part B of FIG. 16 show the output waveforms of the sample and hold circuits 122 and 123 on the basis of the time axis corresponding to the repetition times of the waveforms A51 to A58 in part A of FIG. 16, the waveforms $fD_1$ and $fD_2$ being the output waveforms of the sample and hold circuits 122 and 123, respectively. In these figures, the solid line and the dotted lines are also for the approaching target and the departing target, respectively.

The output waveforms (part C of FIG. 16) of the wave shaping circuits 124 and 125 are as $fD_1'$ and $fD_2'$, respectively. Part A of FIG. 16 shows the output waveform of the comparator 124 differentiated by the differentiation circuit 126. The discriminator circuit 127 uses the negative part of the output waveform of the comparator 125, i.e., the period of a half cycle of the Doppler frequency, as a reset input so that the negative, differentiated input entering as a set input in this period is made invalid. In the case where the discrimination circuit 127 is designed such that it operates with a negative pulse, the output of the discrimination circuit 127, for the departing target, becomes as shown in part E of FIG. 16. In this case, the output thereof is not changed when the differentiated input shown by a solid line as in part D FIG. 16 is the input, resulting in a D.C. output. In this manner it is simple to digitize only the Doppler signal for the departing object. The time at which the set signal is applied from the differentiator circuit 126 to the discrimination circuit 127 need not be exactly at the periods of one half cycle of the output of the comparator 125 in order to operate the discrimination circuit 127 appropriately. Therefore, the delay circuit 121 does not have to provide a delay time exactly equal to a time corresponding to the 90° phase of the intermediate frequency. The delay provided by the delay circuit 121 may be any within a time range corresponding to a phase range of the intermediate frequency larger than 0° and smaller than 180°. This principle does not adversely affect the circuit operation even if the received intermediate frequency $fif$ changes greatly. Further even when there is an unbalance in gain between the sample and hold circuits 122 and 123, it does not adversely affect the operationsince the outputs of these circuits are processed by the subsequent wave shaping circuits 124 and 125, respectively.

In the embodiment in FIG. 14, the intermediate frequency signals are sampled and held by the sample and hold circuits 122 and 123, wherein the sampling pulses are separated by an interval corresponding to a 90° phase shift of the intermediate frequency. Alternatively, it is possible to eliminate the delay circuit 121 and to insert a 90° phase shifter, which shifts the phase of the intermediate frequency by + 90°, into the input side of the sample and hold circuit 122. The circuit will operate in an identical manner to that of FIG. 14.

Another embodiment of the present invention, which is a radar apparatus for detecting the approach of a target using the direction and the velocity of the target as the conditional amounts thereof, will be described with reference to FIGS. 17 to 21.

Figure 17:
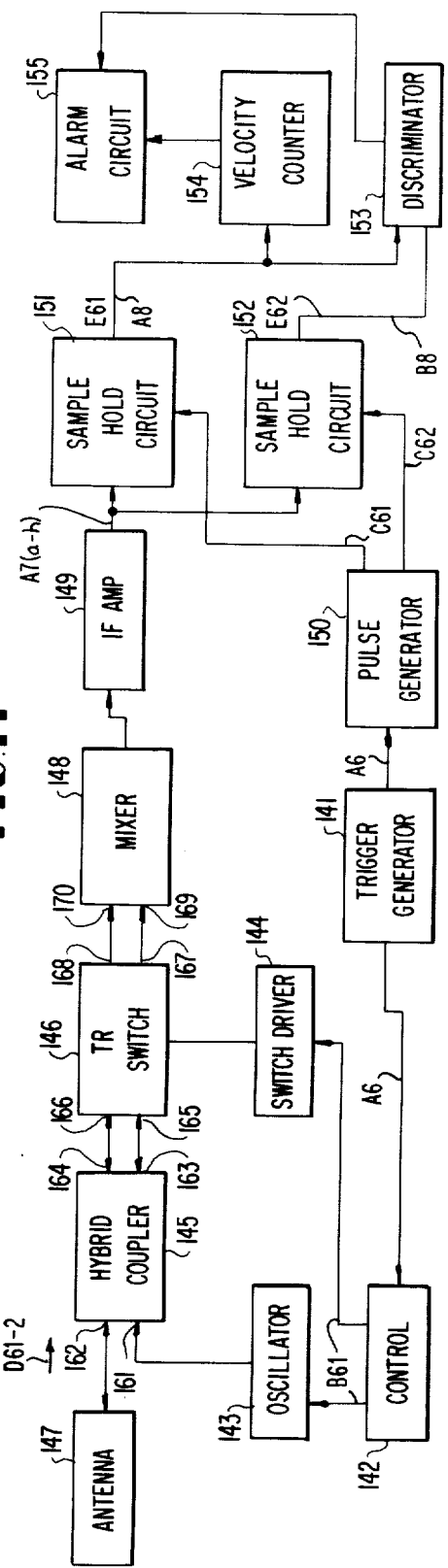
FIGS. 17 and 18 are block diagrams of another embodiment of the present invention.
Figure 19:
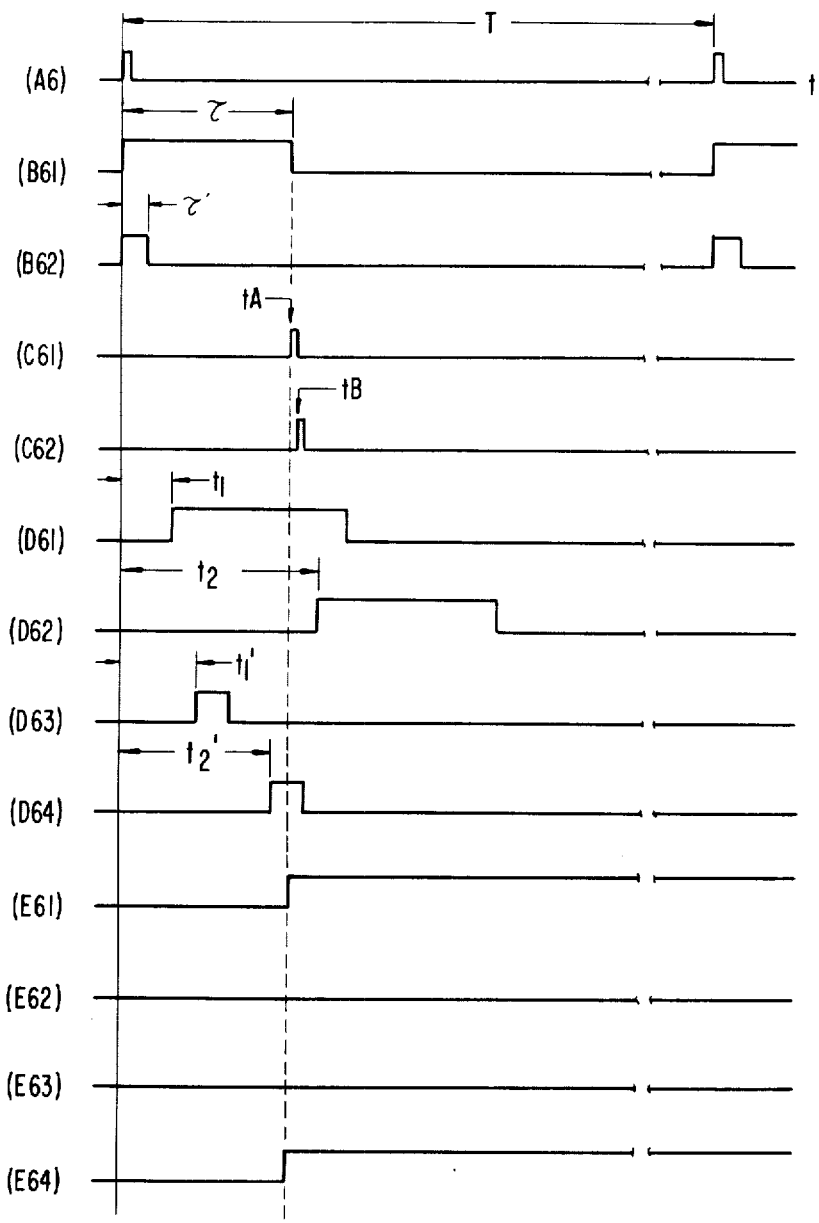
Figure 21:
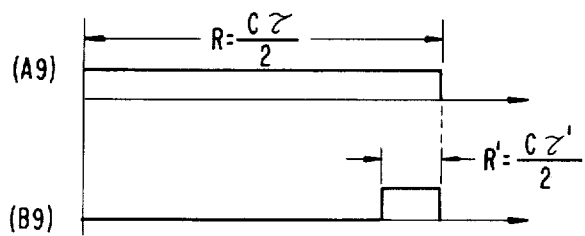

In FIG. 17, a trigger generator 141 produces trigger pulses which determine the radar repetition period, as shown by the waveform A6 in FIG. 19. A control signal generating circuit 142 produces a control signal in synchronism with the trigger generator 141 and controls the oscillation frequency of oscillator 143.

The waveform B61 in FIG. 19 shows the control signal. At the same time, the control signal is supplied to a switch driver 144. The oscillator 143 oscillates at frequency $f_1$ during a first time period $\tau$ of the control signal. The transmitting signal of frequency $f_1$ is supplied to a terminal 161 of a hybrid coupler 145, divided by two therein and appears at terminals 163 and 164. The signals at the latter terminals are fed to terminals 165 and 166 of a TR switch 146. At this time, the TR switch 146 is put in a state where the signals received in its terminals 165 and 166 are reflected. The reflected signals are returned to the terminals 163 and 164 of the hybrid coupler 143, respectively, combined therein and sent through a terminal 162 of the coupler 143 to the antenna 147 to be radiated therefrom.

A portion of the transmitting signal reflected by the target is received by the antenna 147 and fed to the terminal 164 of the hybrid coupler 145. In the hybrid coupler, the echo is divided by two and appears at the terminals 163 and 164. Then the divided echo signals are fed to the terminals 165 and 166 of the TR switch 146. At this time, the TR switch 146 is controlled by the switch driver 144 such that the signals at the terminals 165 and 166 can pass to the terminals 167 and 168 thereof. The signals are then supplied from the terminals 167 and 168 to the terminals 169 and 170 of the mixer 148. In this condition, the oscillator 143 oscillates at frequency $f_2$ which is passed, as a local oscillator signal, through the hybrid coupler 145 and the TR switch 146 to the mixer 148.

Assuming that, as shown by waveforms D61 and D62 in FIG. 19, echoes are received at times $t_1$ and $t_2$ after the transmissions, respectively, the output of the mixer can be obtained only after the time $\tau$ since the intermediate frequency signal from the mixer 148 appears only in a time period during which the oscillator 143 provides the second frequency $f_2$ and the received signals occur during this time. The intermediate frequency signal from the mixer 148 is amplified by an intermediate frequency amplifier 149 and then supplied to the sample and hold circuits 151 and 152, wherein the signals are sampled by sampling pulses shown in waveforms C61 and C62 of FIG. 19 and held, as shown by waveforms E61 and E62 of FIG. 19. The sampling pulses C61 and C62 have pulse widths shorter than the intermediate frequency signal period and are generated by a sampling pulse generator 150 in response to the trigger signal generator 141. The sampling pulse C61 occurs immediately after the time $\tau$, and C62 is delayed from C61 by a time corresponding to a 90° phase shift of the intermediate frequency signal.

The sample and hold circuits 151 and 152 function to detect the Doppler signal component corresponding to the phase shift of successive samples of the intermediate frequency signal, which corresponds to the velocity of the moving target. That is, the sample and hold circuits 151 and 152 and the direction discrimination circuit 153 constitute a circuit for discriminating the moving direction of the target on the basis of the Doppler signal. As described thus far, the circuit of FIG. 17 is substantially the same as a combination of FIGS. 9 and 12 with the following changes; a single mixer 148 is used in place of a pair of mixers 54 and 53, the second sample pulse is delayed rather than shifting the IF by 90°.

Figure 20:
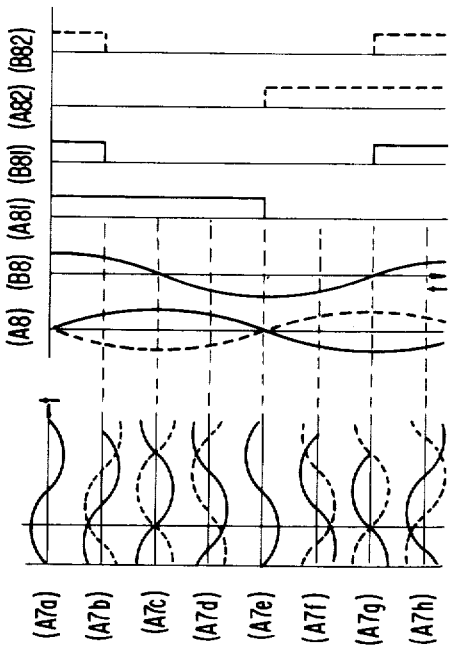
FIGS. 19, 20 and 21 are waveforms for explaining the operations of the embodiments in FIGS. 17 and 18.

FIG. 20 shows the operational waveforms in these circuits. Waveforms A7a to A7h in FIG. 20 show intermediate frequency signals obtained from a common moving target during eight consecutive repetition periods, the solid line and the dotted line corresponding to the approaching and departing targets, respectively.

When the intermediate frequency signals A7a to A7h are sampled and held by the sample and hold circuits 151 and 152 at times $tA$ and $tB$, Doppler signals A8 and B8 are obtained from the respective circuits 151 and 152 as shown in FIG. 20.

By amplifying and wave-shaping the signals A8 and B8, waveforms A81 and B81 are obtained for the approaching target and A82 and B82 are obtained for departing target, each being represented as "H" and "L" (i.e. high and low). The direction discrimination circuit 153 detects the direction by discriminating whether the signal A81 or A82 is H or L at times when the signal B81 or B82 is changed from "H" to "L". If H, then the target is approaching and, if L, it is departing. The discriminator circuit for determining the direction may be the same as hybrid 106' of FIG. 12, or the combination of blocks 124–127 of FIG. 14, or any of the variations of same which have been described heretofore.

The Doppler frequencies developed in circuits 151 and 152 will only exist for moving targets within a range from $R = O$ to $R = C\tau/2$, where C is the velocity of light. As is apparent, if R is $> C\tau/2$ the resulting IF will occur at a time after the sample pulses.

A velocity counting circuit 154 is connected to the sample and hold circuit 151 to measure the Doppler signal frequency to thereby compute the moving velocity of the target. The device may be a cycle counter or frequency measurement device or the like, many of which are known in the art. An alarm device 155 produces an alarm signal according to the velocity information obtained from the velocity counting circuit 154 and the approaching signal obtained from the direction discrimination circuit 153.

The radar apparatus of this embodiment can detect continuously a target existing in a distance range between 0 and $C\tau/2$. However, if there are a plurality of targets in this range, it is unclear which target causes the information obtained.

Figure 18:
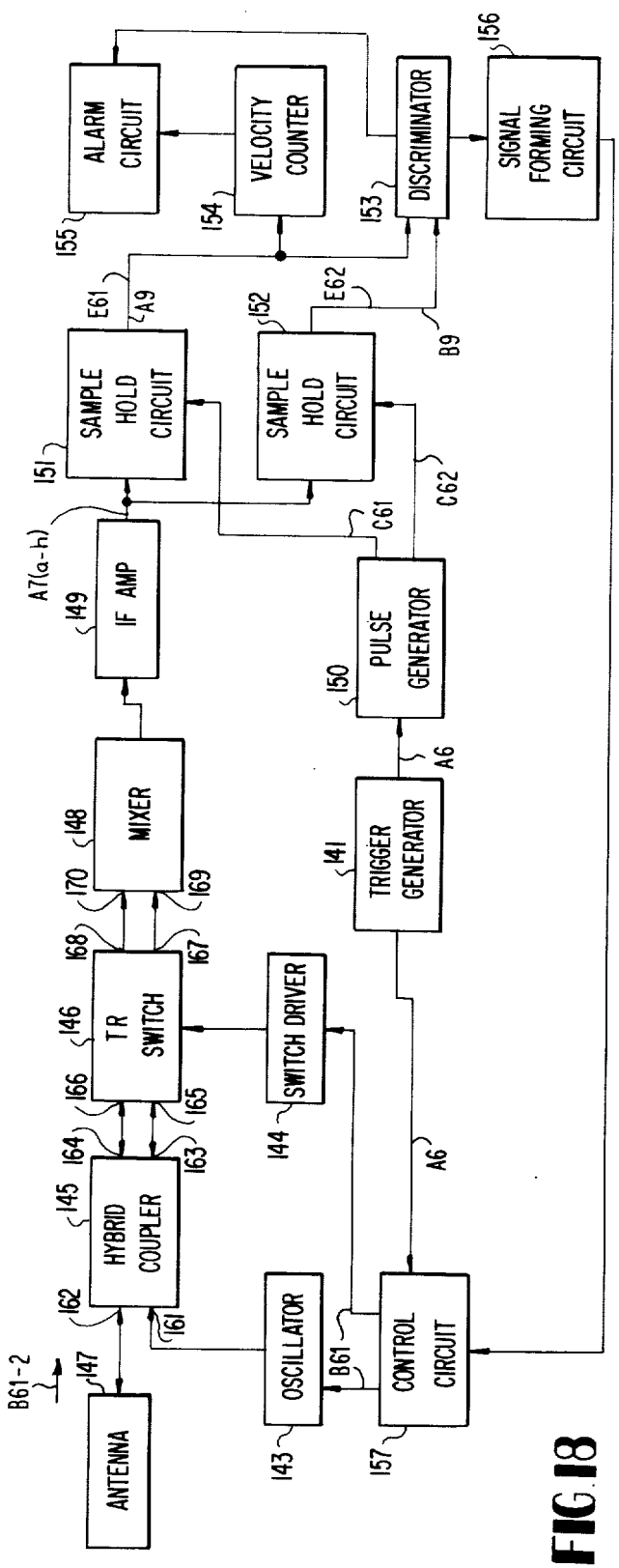

Another embodiment of the present invention as shown in FIG. 18 is provided with an additional device which determines the target concerned.

As can be seen, the device of FIG. 18 is the same as FIG. 17 except for the addition of a departing signal forming circuit 156 and the substitution of control circuit 157 for control circuit 142. These changes cause the system to operate on the following philosophy. When the transmitted signal has the duration $\tau$, moving targets within an alarm range $R = 0$ to $R = C\tau/2$ are detected and the alarm is actuated if the target is approaching. However, if a departing target is nearer to the radar than an approaching target, even though both are within said alarm range, the echoes from the departing target may control the circuitry to the extent of the Doppler signals only indicate the departing target. Therefore the circuit is altered whenever a departing target is detected within the alarm range to search only for targets within a very narrow range window centered at $R = C\tau/2$. In other words, at this time the system looks only for targets just entering or just leaving the alarm range. As a consequence, a very near departing target will not mask an approaching target just entering the alarm range.

This operation is accomplished simply by shortening the transmitted pulse duration from $\tau$ to $\tau'$ as shown in B62 of FIG. 19. When a signal, indicating the existence of a departing target within the alarm range, is supplied by the circuit 153 to the departing signal forming circuit 156, it holds the latter signal for a certain time. This causes the control signal generator 157, connected to the departing signal forming circuit 156, to operate for $\tau'$ as shown by waveform B61 in FIG. 19. The oscillator 143 and the switch driver 144 are actuated upon the operation of the control signal generator 157 for this short time $\tau$.

Reflected signals from two targets are shown at D63 and D64, respectively. Although both echoes will result in IF outputs from the mixer, only D64 will be sampled in the sample and hold circuits. Thus the target causing D63 is ignored during the time that signal forming circuit 156 holds the indication of a departing target. It will be appreciated that the range window during this time is from $R = (C\tau - \tau')/2$ to $R = C\tau/2$.

Departing signal forming circuit 156 is designed to hold the signal from the direction discriminating circuit 153 so that the operation time with the transmitting pulse width $\tau'$ can sufficiently cover the time required to compute the velocity information in the velocity counting circuit 154 on the basis of the Doppler signals.

What is claimed is:

1. A radar apparatus, comprising: a microwave head portion including an antenna adapted to transmit an electromagnetic wave of a first frequency and to receive a reflection wave from at least one target, an oscillator capable of selectively producing said first frequency and a second local oscillator frequency, said oscillator first frequency being connected to said antenna to provide said electromagnetic wave, control circuit means for controlling the time of generation of said first and second frequencies by said oscillator, and a mixer for providing an intermediate frequency signal upon receipt of said reflection wave of said first frequency and a signal wave of said second frequency from said oscillator; an intermediate frequency amplifier circuit responsive to said intermediate frequency signal from said microwave head portion for amplifying said intermediate frequency signal; and signal processing means responsive to said intermediate frequency signals from said mixer for developing conditional signals representative of conditions of said target, said signal processing means comprising, a sampling pulse generation circuit for producing sampling pulses each having a pulse width shorter than the period of said intermediate frequency signal, and a sample and hold circuit means responsive to said sampling pulses for sampling and holding the instantaneous amplitude values of said intermediate frequency signal.

2. A radar apparatus as set forth in claim 1, wherein said signal processing means further comprises detection circuit means responsive to the output of said intermediate frequency amplifier circuit for providing video signals at the output thereof, said video signals containing distance information of said target and being supplied to said sampling pulse generator circuit for controlling the time of generation of said sampling pulses, whereby the output of said sample and hold circuit means contains velocity information of said target.

3. A radar apparatus as set forth in claim 1, wherein said sampling pulse generator circuit of said signal processing means is connected to and responsive to said control means to generate said sampling pulses at fixed times relative to the time of transmission of said electromagnetic wave, whereby the output signal of said sample and hold circuit means represents the velocity information of the target.

4. A radar apparatus as set forth in claim 3, further comprising an alarm indicating means connected to the output of said sample and hold circuit means for detecting an approaching target within a predetermined range.

5. A radar apparatus as set forth in claim 1, wherein said control means is connected to said sampling pulse generation circuit to cause same to generate sampling pulses at fixed times relative to the transmission time of said electromagnetic wave, and said signal processing means further includes a first 90° phase shifter connected to the output of said intermediate frequency amplifier circuit, a second sample and hold circuit means responsive to the output of said first phase shifter and to said sampling pulses for sampling and holding the instantaneous amplitude valves of the intermediate frequency signal delayed by 90°, a second phase shifter connected to the output of said second sample and hold circuit to provide a phase delay of 90° to the output of said second sample and hold circuit means and a combination means for combining the output signals from the first of said sample and hold circuit means and from said second phase shifter to provide an indication of the moving direction of said target.

6. A radar apparatus as set forth in claim 5, wherein said combination means comprises an adder circuit and a subtractor circuit, each of said latter circuits individually arithmetically combining said signals applied to said combining means.

7. A radar apparatus as set forth in claim 1, wherein said control means is connected to said sampling pulse generation circuit to cause same to generate sampling pulses at fixed times relative to the transmission time of said electromagnetic wave, and wherein said signal processing means further comprises a first 90° phase shifter for delaying the intermediate frequency signal from said intermediate frequency amplifier circuit by 90°, a second sample and hold circuit means adapted to receive the 90° delayed intermediate frequency signal for sampling and holding the instantaneous amplitude value of the delayed intermediate frequency signal in response to said sampling pulses, and a 90° hybrid circuit means, connected to the outputs of said first and second sample and hold circuit means, for providing a moving direction indication output in dependence upon the phase relation of said output signals from said first and second sample and hold circuit means.

8. A radar apparatus as set forth in claim 1, wherein said control means is connected to said sampling pulse generation circuit to cause same to generate sampling pulses at fixed time relative to the transmission time of said electromagnetic wave, and said signal processing means further includes, a first 90° phase shifter for delaying the intermediate frequency signal from said intermediate frequency amplifier circuit by 90°, a second sample and hold circuit means adapted to receive the delayed intermediate frequency signal for sampling and holding the instantaneous amplitude value of the delayed intermediate frequency in response to said sampling pulses, a first wave shaping means connected to said first sample and hold circuit means for converting the output waveform of said first sample and hold circuit means to a rectangular signal, a second wave shaping means connected to said second sample and hold circuit means for converting the output waveform of said second sample and hold circuit means to a rectangular signal, a differentiation circuit connected to the output of one of said first and second wave shaping means for generating setting pulses, and a discriminator circuit connected to the outputs of said differentiation circuit and the other of said wave shaping means for providing an output indicative of the moving direction of said target.

9. A radar apparatus as set forth in claim 8, wherein said discrimination circuit comprises a flip-flop circuit, the set input of which is connected to the output of said differentiation circuit and the reset input of which is connected to the output of the other of said wave shaping means.

10. A radar apparatus as set forth in claim 1 wherein said sampling pulse generator comprises means for generating a first group of sampling pulses having a fixed time relation to the transmission time of said electromagnetic wave, means for generating a second group of sampling pulses delayed from said first sampling pulses an amount equal to one quarter of the period of said intermediate frequency signal, each of said sampling pulses generated having a pulse width shorter than the period of said intermediate frequency signal, said first group being applied to said sample and hold circuit means, and wherein said signal processing means further comprises a second sample and hold circuit adapted to sample and hold instantaneous values of the amplitude of said intermediate frequency signal in response to said second group of sample pulses which are connected thereto.

11. A radar apparatus as claimed in claim 10 wherein said signal processing circuit further comprises, a first wave shaping means connected to said first sample and hold circuit means to convert the output waveform of said first sample and hold circuit means to a rectangular wave signal, a second wave shaping means connected to said second sample and hold circuit means to convert the output waveform of the second sample and hold circuit means to a rectangular wave signal, a differentiation circuit connected to said second wave shaping means to differetiate the output signal to said second sample and hold circuit means, and a discriminator connected to the outputs of said differentiation circuit and said first wave shaping means to provide an output signal indicative of the moving direction of said target.

12. A radar apparatus as set forth in claim 11, wherein, said discriminator comprises a flip-flop circuit having a set input connected to said differentiation circuit, the moving direction of the target being obtained on the basis of the output of said flip-flop.

13. A radar apparatus as set forth in claim 10, wherein said signal processing means further comprises a phase shifter connected to the output of said sample and hold circuit means for shifting the phase of the output of said second sample and hold circuit means by 90°, and a combination circuit means having inputs supplied with the output of said first sample and hold circuit means and with the output of said phase shifter for arithmetically combining said inputs to provide an output indicative of the moving direction of said target.

14. A radar apparatus as set forth in claim 10, wherein said signal processing means further comprises, a 90° hybrid circuit connected to the outputs of said first and second sample and hold circuit means for providing a moving direction indication output in dependence upon the phase relation of said outputs.

15. The radar apparatus as claimed in claim 10 wherein the duration of said electromagnetic wave is $\tau$ and said first sampling pulses occur at a time $\tau$ following the start of each electromagnetic wave, whereby the sample and hold circuit means have a.c. outputs only if said target is moving and within a range equal or less than $C\tau/2$, where C is the velocity of light and wherein said signal processing circuit further comprises discriminator means responsive to the outputs from said first and second sample and hold means for providing an output indicative of the presence and direction of movement of a target within said range, velocity detector means responsive to one of the outputs from said first and second sample and hold means for detecting the velocity of said target, and alarm means connected to said discriminator means and said velocity detector means for providing an alarm condition when said target is approaching at a velocity above a predetermined amount.

16. The radar apparatus as claimed in claim 15 further comprising signal forming means connected between said discriminator means and said control means and responsive to the detection of a departing target within said range for changing, for a fixed period of time, the duration of the transmitted wave from $\tau$ to $\tau'$, where $\tau'$ is substantially less than $\tau$.

17. A radar apparatus as claimed in claim 1 wherein said microwave head portion further comprises, a hybrid coupler having four terminals, said antenna and oscillator being connected to first and second terminals, respectively, first and second TR switch means connected to said third and fourth terminals and adapted to pass to said mixer means signals appearing at said third and fourth terminals when in a first switching state and to reflect signals appearing at said third and fourth terminals when in a second switching state, said TR switch means being controllably switched back and forth between said first and second switching states by said control means, whereby during a transmit mode the oscillator signals of a first frequency applied to said second terminal are reflected by said TR switch means and appear at said first terminal for transmission, and during a receive mode echo signals and oscillator signals of a second frequency pass through said TR switch means to said mixer means.

18. A radar apparatus as set forth in claim 17, wherein said signal processing means further comprises detection circuit means responsive to the output of said intermediate frequency amplifier circuit for providing video signals at the output thereof, said video signals containing distance information of said target and being supplied to said sampling pulse generator circuit for controlling the time of generation of said sampling pulses, whereby the outut of said sample and hold circuit means contains velocity information of said target.

19. A radar apparatus as set forth in claim 17, wherein said sampling pulse generator circuit of said signal processing means is connected to and responsive to said control means to generate said sampling pulses at fixed times relative to the time of transmission of said electromagnetic wave, whereby the output signal of said sample and hold circuit means represents the velocity information of the target.

20. A radar apparatus as set forth in claim 19, further comprising an alarm indicating means connected to the output of said sample and hold circuit means for detecting an approaching target within a predetermined range.

21. A radar apparatus as set forth in claim 17, wherein said control means is connected to said sampling pulse generation circuit to cause same to generate sampling pulses at fixed times relative to the transmission time of said electromagnetic wave, and said signal processing means further includes a first 90° phase shifter connected to the output of said intermediate frequency amplifier circuit, a second sample and hold circuit means responsive to the output of said first phase shifter and to said sampling pulses for sampling and holding the instantaneous amplitude values of the intermediate frequency signal delayed by 90°, a second phase shifter connected to the output of said second sample and hold circuit to provide a phase delay of 90° to the output of said second sample and hold circuit means and a combination means for combining the output signals from the first of said sample and hold circuit means and from said second phase shifter to provide an indication of the moving direction of said target.

22. A radar apparatus as set forth in claim 21, wherein said combination means comprises an adder circuit and a subtractor circuit, each of said latter circuits individually arithmetically combining said signals applied to said combining means.

23. A radar apparatus as set forth in claim 17, wherein said control means is connected to said sampling pulse generation circuit to cause same to generate sampling pulses at fixed times relative to the transmission time of said electromagnetic wave, and wherein said signal processing means further comprises a first 90° phase shifter for delaying the intermediate frequency signal from said intermediate frequency amplifier circuit by 90°, a second sample and hold circuit means adapted to receive the 90° delayed intermediate frequency signal for sampling and holding the instantaneous amplitude value of the delayed intermediate frequency signal in response to said sampling pulses, and a 90° hybrid circuit means, connected to the outputs of said first and second sample and hold circuit means, for providing a moving direction indication output in dependence upon the phase relation of said output signals from said first and second sample and hold circuit means.

24. A radar apparatus as set forth in claim 17, wherein said control means is connected to said sampling pulse generation circuit to cause same to generate sampling pulses at fixed time relative to the transmission time of said electromagnetic wave, and said signal processing means further includes, a first 90° phase shifter for delaying the intermediate frequency signal from said intermediate frequency amplifier circuit by 90°, a second sample and hold circuit means adapted to receive the delayed intermediate frequency signal for sampling and holding the instantaneous amplitude value of the delayed intermediate frequency in response to said sampling pulses, a first wave shaping means connected to said first sample and hold circuit means for converting the output waveform of said first sample and hold circuit means to a rectangular signal, a second wave shaping means connected to said second sample and hold circuit means for converting the output waveform of said second sample and hold circuit means to a rectangular signal, a differentiation circuit connected to the output of one of said first and second wave shaping means for generating setting pulses, and a discriminator circuit connected to the outputs of said differentiation circuit and the other of said wave shaping means for providing an output indicative of the moving direction of said target.

25. A radar apparatus as set forth in claim 24, wherein said discrimination circuit comprises a flip-flop circuit, the set input of which is connected to the output of said differentiation circuit and the reset input of which is connected to the output of the other of said wave shaping means.

26. A radar apparatus as set forth in claim 17 wherein said sampling pulse generator comprises means for generating a first group of sampling pulses having a fixed time relation to the transmission time of said electromagnetic wave, means for generating a second group of sampling pulses delayed from said first sampling pulses an amount equal to one quarter of the period of said intermediate frequency signal, each of said sampling pulses generated having a pulse width shorter than the period of said intermediate frequency signal, said first group being applied to said sample and hold circuit means, and wherein said signal processing means further comprises a second sample and hold circuit adapted to sample and hold instantaneous values of the amplitude of said intermediate frequency signal in response to said second group of sample pulses which are connected thereto.

27. A radar apparatus as claimed in claim 26, wherein said signal processing circuit further comprises, a first wave shaping means connected to said first sample and hold circuit means to convert the output waveform of said first sample and hold circuit means to a rectangular wave signal, a second wave shaping means connected to said second sample and hold circuit means to convert the output waveform of the second sample and hold circuit means to a rectangular wave signal, a differentiation circuit connected to said second wave shaping means to differentiate the output signal of said second sample and hold circuit means, and a discriminator connected to the outputs of said differentiation circuit and said first wave shaping means to provide an output signal indicative of the moving direction of said target.

28. A radar apparatus as set forth in claim 27, wherein, said discriminator comprises a flip-flop circuit having a set input connected to said differentiation circuit, the moving direction of the target being obtained on the basis of the output of said flip-flop.

29. A radar apparatus as set forth in claim 26, wherein said signal processing means further comprises a phase shifter connected to the output of said second sample and hold circuit means for shifting the phase of the output of said second sample and hold circuit means by 90°, and a combination circuit means having inputs supplied with the output of said first sample and hold circuit means and with the output of said phase shifter for arithmetically combining said inputs to provide an output indicative of the moving direction of said target.

30. A radar apparatus as set forth in claim 26, wherein said signal processing means further comprises, a 90° hybrid circuit connected to the outputs of said first and second sample and hold circuit means for providing a moving direction indication output in dependence upon the phase relation of said outputs.

31. The radar apparatus as claimed in claim 26 wherein the duration of said electromagnetic wave is $\tau$ and said first sampling pulses occur at a time $\tau$ following the start of each electromagnetic wave, whereby the sample and hold circuit means have a.c. outputs only if said target is moving and within a range equal or less than $C\tau/2$, where C is the velocity of light and wherein said signal processing circuit further comprises discriminator means responsive to the outputs from said first and second sample and hold means for providing a output indicative of the presence and direction of movement of a target within said range, velocity detector means responsive to one of the outputs from said first and second sample and hold means for detecting the velocity of said target, and alarm means connected to said discriminator means and said velocity detector means for providing an alarm condition when said target is approaching at a velocity above a predetermined amount.

32. The radar apparatus as claimed in claim 31 further comprising signal forming means connected between said discriminator means and said control means and responsive to the detection of a departing target within said range for changing, for a fixed period of time, the duration of the transmitted wave from $\tau$ to $\tau'$, where $\tau'$ is substantially less than $\tau$.

33. A radar apparatus as set forth in claim 17, wherein said oscillator comprises a solid state oscillation element provided in a cavity resonator.

34. A radar apparatus as set forth in claim 33, wherein said solid state oscillation element is a Gunn diode.

35. A radar apparatus as claimed in claim 17, wherein said mixer for providing an intermediate frequency signal and said first and second TR switch means, together consist of a first mixing and switching device connected to said third terminal and a second mixing and switching device connected to said fourth terminal.

36. A radar apparatus as claimed in claim 35, wherein each of said first and second mixing and switching devices is a diode mount capable of being controlled to have a short circuit mode for reflecting signals applied thereto and a mixer mode for mixing signals applied thereto.

37. A radar apparatus as set forth in claim 1, wherein said oscillator comprises a solid state oscillation element provided in a cavity resonator.

38. A radar apparatus as set forth in claim 37, wherein said solid state oscillation element is a Gunn diode.

* * * * *